A. W. GRANNIS.
ADJUSTABLE IMPLEMENT.
APPLICATION FILED JUNE 19, 1920.
1,375,751.  Patented Apr. 26, 1921.
Fig. 1.
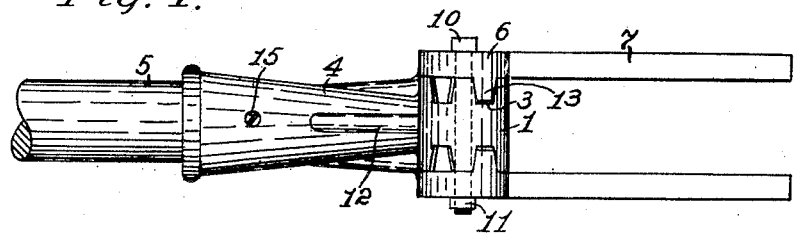
Fig. 2.
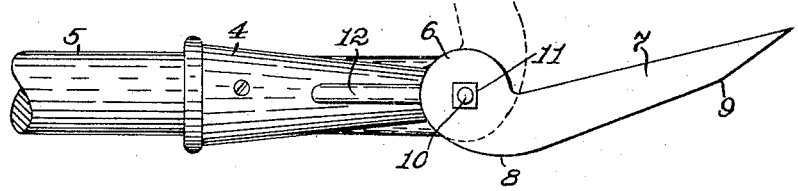
Fig. 3.
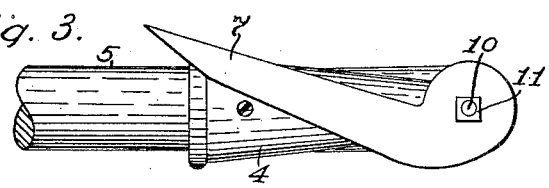
Fig. 4.
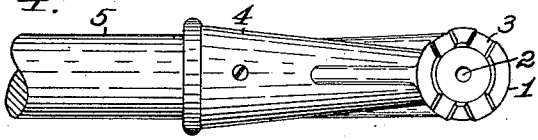
Fig. 5.
Inventor,
Arthur W. Grannis, by
G. C. Kennedy.
Attorney.

UNITED STATES PATENT OFFICE.

ARTHUR W. GRANNIS, OF WATERLOO, IOWA.

ADJUSTABLE IMPLEMENT.

1,375,751. Specification of Letters Patent. Patented Apr. 26, 1921.

Application filed June 19, 1920. Serial No. 390,222.

*To all whom it may concern:*

Be it known that I, ARTHUR W. GRANNIS, a citizen of the United States of America, and a resident of Waterloo, Blackhawk county, Iowa, have invented certain new and useful Improvements in Adjustable Implements, of which the following is a specification.

My invention relates to improvements in adjustable implements, and the object of my improvement is to furnish a tool suitable for use as a wrecking or prying implement, in dismantling buildings, separating timber structures, and otherwise in any other ways for which it may be applicable, the parts of the tool being adjustably assembled for relative changes of position in its operating devices as may be needed.

The above object I have accomplished by the means which are hereinafter fully described and claimed, and which are illustrated in the accompanying drawings, in which Figure 1 is a plan view of my improved adjustable implement, with the elongated handle broken away; Fig. 2 is a side elevation of the same, the full lines and the broken lines showing the prying members in two differently adjusted positions angularly relative to the supporting shank; Fig. 3 is a side elevation of the implement, showing the prying members swung over upon opposite sides of the shank, reversely, for compactness in storage and packing; Fig. 4 is a detail side elevation of the shank part only, and Fig. 5 is a detail perspective view of one of the prying members, displaying its inner face with detents.

In said figures, similar numerals of reference denote similar parts throughout the several views.

The implement comprises associated and related elements as follows: An elongated handle 5 on one end of which a conical hollow shank 4 is removably secured by a screw 15. A pair of like members 7 which with their discoidal end-parts 6 are a right and a left. The shank 4 has a transversely positioned cylindric head 1, centrally transversely orificed at 2 to receive a bolt 10, the latter also traversing orifices 14 also centrally located in the discoidal parts 6, and a nut 11 being used to secure the parts 6 on opposite ends of the head 1 in adjusted position.

The head 1 and the shank 4 have reinforcing ribs 12 connecting them across the angle of their joint where weakest, as shown. The members 7 are spaced apart in parallel, and their discoidal end parts 6 are adjustably mounted upon and engaged with the opposite end faces of the head 1 by the following means.

Each opposite end of the head 1 is flat but has radial diminished depressions 3 to mate with diminished or wedging detents 13 on the opposing faces of the discoidal parts 6. As shown, on each face of the head 1 are two sets of diametrically alined depressions 3, positioned at a suitable angular relation to each other, but on the discoidal parts 6 are but one pair of diametrically alined detents 13, which therefore may be mated with either pair of said depressions 3 to locate the prying members 7 at different angular relations to the line of the shank 4 and the operating handle 5. In Fig. 2, the full and the broken lines display both of the adjusted positions in which the members 7 are normally operative, or used in the business of prying apart or wrecking timber structures.

In order to secure maximum efficiency to the members 7 for such uses, each member 7 terminates in a wedged point sloping thence toward an angular shoulder 9, and again sloping straightly toward a curved shoulder 8 near but offset from the discoidal part 6. The upper or opposite edge of each member is straight and preferably directed toward the axis of said part 6. In use, as in prying apart timbers or removing boards, the shoulders 9 and 8 serve successively or singly as needed for fulcra, the long shank and handle giving a powerful leverage. The spacing apart of the members 7 permits them to ride upon a cross-beam or joist in the removing of siding or other parts without interference. When taken apart for packing or transportation, the members 7 may be secured in reversed or overlapped positions upon the shank 4 as shown in Fig. 3 for compactness and convenience.

Having described my invention, what I claim as new, and desire to secure by Letters Patent, is:

1. An implement of the character described, comprising a lever provided with a cross-head having oppositely-directed clutch-faces, mating clutch-members engaged adjustably with the clutch-faces of the cross-head, and prying members integral with and extending from said clutch-members in parallel spaced relation.

2. An implement of the character described, comprising a supporting body, prying members secured rotatably adjustably upon opposite sides of said supporting body, the members being spaced apart, of like form, and having on like edges like fulcral enlargements.

3. An implement of the character described, comprising an elongated handle, a hollow shank removably secured on one end thereof, said shank having a cylindric cross-head with discoidal opposite end-faces provided with pairs of diametrically-alined diminished depressions, and clamping-bodies having each a pair of diametrically-alined diminished detents to mate with any pair of said diminished depressions, said clamping-bodies having projecting arms, and means for removably adjustably securing said clamping-bodies upon the ends of said cross-head.

Signed at Waterloo, Iowa, this 16th day of June, 1920.

ARTHUR W. GRANNIS.